United States Patent [19]
Fukuda et al.

[11] Patent Number: 5,631,457
[45] Date of Patent: May 20, 1997

[54] TWO-DIMENSIONAL SYMBOL DATA READ APPARATUS

[75] Inventors: Yoshio Fukuda; Hisakatsu Tanaka; Masahiro Takizawa, all of Tokyo, Japan

[73] Assignee: Olympus Optical Co., Ltd., Tokyo, Japan

[21] Appl. No.: 514,669

[22] Filed: Aug. 14, 1995

[30] Foreign Application Priority Data

Aug. 17, 1994 [JP] Japan .................. 6-193322
Mar. 3, 1995 [JP] Japan .................. 7-044349

[51] Int. Cl.$^6$ ........................... G06K 7/10
[52] U.S. Cl. ........................... 235/462; 235/472
[58] Field of Search ................... 235/462, 472

[56] References Cited

U.S. PATENT DOCUMENTS

| 5,304,786 | 4/1994 | Pavlidis | 235/462 |
|---|---|---|---|
| 5,304,787 | 4/1994 | Wang | 235/462 |
| 5,396,054 | 3/1995 | Krichever | 235/462 |
| 5,422,470 | 6/1995 | Kubo | 235/462 |
| 5,428,211 | 6/1995 | Zheng | 235/462 |
| 5,471,041 | 11/1995 | Inoue et al. | 235/462 |

FOREIGN PATENT DOCUMENTS

| 2-268383 | 11/1990 | Japan . |
|---|---|---|
| 3-154187 | 7/1991 | Japan . |
| 3-204793 | 9/1991 | Japan . |
| 5-307627 | 11/1993 | Japan . |
| 5-324887 | 12/1993 | Japan . |

*Primary Examiner*—Harold Pitts
*Attorney, Agent, or Firm*—Frishauf, Holtz, Goodman, Langer & Chick

[57] ABSTRACT

The symbol data read apparatus comprises a two-dimensional image pick-up device for picking up a bar-code symbol consisting of bars and spaces, as a two-dimensional image. A frame memory stores the two-dimensional image from the two-dimensional image pick-up device, as bar-code symbol data. A condition detect section detects a bar-code condition of the bar-code symbol from the bar-code symbol data stored in the frame memory. A decode section performs decode-processing to obtain original bar-code symbol data on the basis of bar-code condition data from the condition detect section and the bar-code symbol data from the frame memory. An output select section selectively outputs at least data other than the original bar-code symbol data out of the original bar-code symbol data and the other data than the original bar-code symbol data. The other data than the original bar-code symbol data includes inclination data concerning the bar-code symbol and a weighting value for every block.

17 Claims, 9 Drawing Sheets

PCS VALUE = k (AR/W)   (k IS CONSTANT)

TWO-DIMENSIONAL SYMBOL DATA READ APPARATUS

BACKGROUND OF THE INVENTION

1. Field of the Invention

The present invention relates to a symbol data read apparatus for reading symbol data such as bar-codes or the like and for outputting processed data.

2. Description of the Related Art

In general, a one-dimensional bar-code consisting of a plurality of bars and spaces alternately disposed is used as symbol data representing various information. A bar-code is normally printed directly on an article, or indirectly on a seal sheet or the like which is stuck on an article.

Japanese Patent Application KOKAI Publication No. 5-307627 discloses a bar-code read apparatus having functions of printing a one-dimensional bar-code as explained above, confirmation and reading thereof.

Further, when the presence of a bar-code need be kept secret from third persons, or when distribution control is needed although it is not desirable to print a bar-code on a product due to design matters, conventional methods of visible printing are not suitable. In view of such cases, Japanese Patent Application KOKAI Publication No. 3-154187 proposes a bar-code printing method of printing a bar-code with use of invisible material, e.g., photoluminescence ink which cannot be observed with eyes under normal light (including sun light). To read an invisible bar-code thus printed, light of a certain frequency having a particular wavelength (e.g., a near infrared ray) is irradiated, and radiation light having another wavelength is reflected therefrom, which is read out.

However, the one-dimensional bar-code data read apparatus described in the Japanese Patent Application KOKAI Publication No. 5-307627 deals with only one-dimensional bar-codes, and cannot read respective rows of two-dimensional bar-codes (or stacked bar-codes). A two-dimensional bar-code is constituted by a number of codes and therefore requires more data than normally required, e.g., confirmation data, so that a large amount of data must be subjected to processing. As a result of this, much time is required to read a two-dimensional bar-code, while there has not been a confirmation apparatus capable of processing such a large amount of data.

Meanwhile, a bar-code printed with ink of invisible material according to the Japanese Patent Application KOKAI Publication No. 3-154187 cannot be viewed with eyes, so that it is difficult to find degradation induced by heat and light such as sun light. Such deterioration causes reading errors. Degradation caused during use, such as stains of a label, chipping on its surface, or the like also causes reading errors.

Therefore, a user finds it impossible to properly read a bar-code before a reading error is notified after an operation for reading the bar-code is once performed. In a case where a bar-code printed on a card or the like cannot be read out, the card is determined as a card error. If a new card is not reissued immediately after a card error is found out, the card cannot be used until reissue of a new card. This has been a problem when a card is managed.

SUMMARY OF THE INVENTION

Consequently, the present invention has a first object of providing a symbol data read apparatus which selectively outputs bar-code data other than original bar-code symbol data, to enable exact reading of a two-dimensional bar-code in a short time period.

In addition, the present invention has a second object of providing a symbol data read apparatus which expresses a quality condition of a bar-code in the form of a numerical value, to enable the degradation condition of the bar-code to be obtained.

In order to achieve the first object, the symbol data read apparatus according to the present invention comprises: image pick-up means for picking up a bar-code symbol as a two-dimensional image, the bar-code symbol consisting of a bar and a space; memory means for storing the two-dimensional image from the image pick-up means as bar-code symbol data; condition detect means for detecting a bar-code condition of the bar-code symbol from the bar-code symbol data stored in the memory means; decode means for performing decode-processing to obtain original bar-code symbol data on the basis of bar-code condition data from the condition detect means and the bar-code symbol data from the memory means; and output means for selectively outputting at least data other than the original bar-code symbol data out of the original bar-code symbol data and the other data than the original bar-code symbol data.

Further, in order to achieve the second object, the symbol data read apparatus according to the present invention comprises: two-dimensional image pick-up means for picking up a bar-code as a two-dimensional image, the bar-code representing data in the form of a bar and a space; condition detect means for detecting a pick-up condition of the bar-code, as a numerical value, from the two-dimensional image obtained by the two-dimensional image pick-up means, and for comparing the numerical value with a predetermined threshold value, thereby to detect a condition of the bar-code; display means for displaying the condition of the bar-code detected by the condition detect means; and decode means for performing decode-processing to obtain original symbol data on the basis of the two-dimensional image picked up by the two-dimensional image pick-up means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

In the following, embodiments of the present invention will be specifically explained with reference to the drawings.

A first embodiment will now be explained. In the first embodiment, a bar-code symbol consisting of a bar and a space is picked up as a two-dimensional image by a pick-up means, and the two-dimensional image thus obtained is stored as symbol data in a frame memory. Further, a bar-code condition of the bar-code symbol is detected from the stored bar-code symbol data, and decoding is performed on the basis of the bar-code condition data and the bar-code symbol data, to obtain the original bar-code symbol. Then, out of the original bar-code symbol data and data other than the bar-code symbol data, at least the data other than the bar-code symbol data is selectively outputted. The data other than the original bar-code symbol data, for example, includes data concerning an inclination of a bar-code, a weighting value for each of blocks of a bar-code, or the like.

Figure 1:
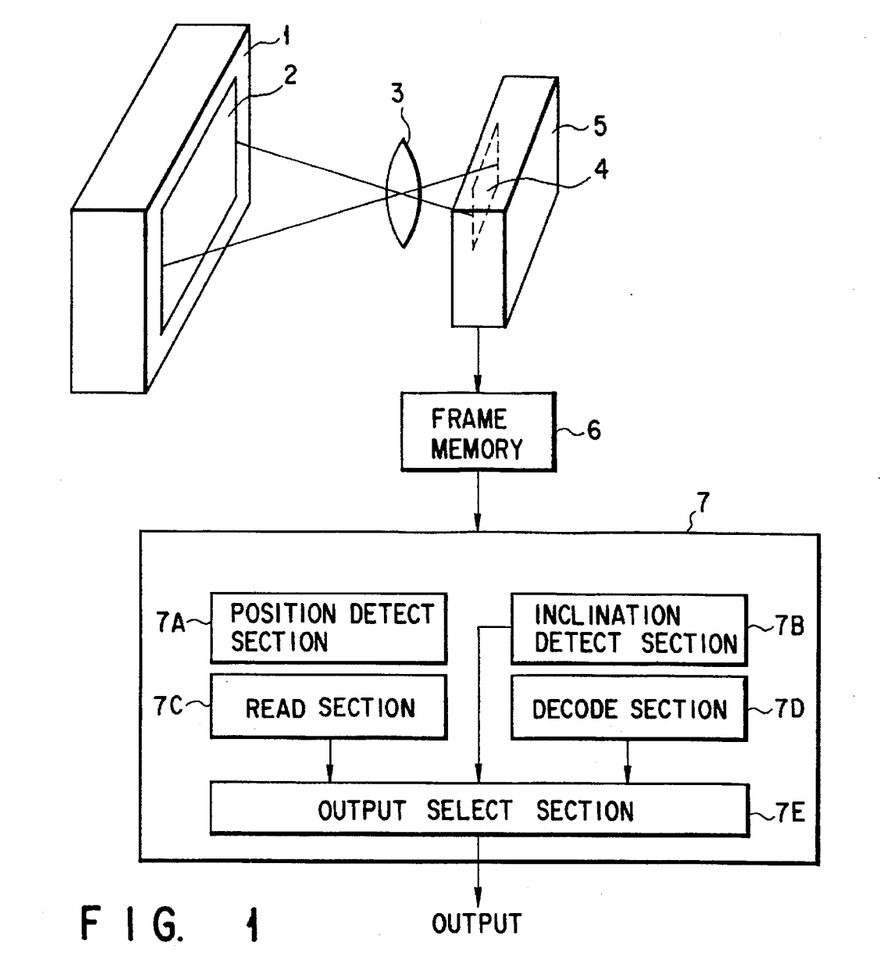
FIG. 1 is a view showing the structure of a symbol data read apparatus according to a first embodiment of the present invention.

FIG. 1 shows the structure of a symbol data read apparatus according to the first embodiment of the present invention. In FIG. 1, light reflected from a stacked bar-code label printed on a baggage 1, e.g., a two-dimensional bar-code label 2 in a PDF-417 format, is focused on a photoelectric conversion surface 4 mounted in a two-dimensional image pick-up device 5 by means of an image forming lens 3. Label data photoelectrically converted by the two-dimensional image pick-up device 5 is taken into a frame memory 6, as a two-dimensional image (or a video signal) of a bar-code. A data processing device 7 performs various processing on bar-code symbol data stored in the frame memory 6, as will be described below.

The data processing device 7, for example, includes of a CPU and a memory, and comprises a position detect section 7A, an inclination detect section 7B, a read section 7C, a decode section 7D, and an output select section 7E. Further, the memory of the bar-code data processing device consists of various registers for storing various constants and parameters. The detect section 7B and the read section 7C are coupled to form a condition detect means.

The position detect section 7A serves to estimate position data of a bar-code. The inclination detect section 7B detects and outputs inclination data on the basis of the bar-code symbol data stored in the frame memory 6. The read section 7C serves to read bar-code symbol data and comprises the following means. Specifically, the read section 7C comprises a weighting means for applying weights to bar-code symbol data and for outputting weighted data in units of blocks, a PCS calculation means for obtaining a PCS value from the bar-code symbol data and an initial value as a reference and for outputting the obtained value for each of units of blocks, an error count determination means for determining presence or absence of an error on the basis of the data weighted by the weighting means and for counting the number of errors if any, a count means for counting the number of times for which error correction is failed although error correction has been tried, a read condition switch means for switching allowable set values each representing a width of a unit block of bar-code symbol data as well as the number of scanning lines when the inclination detection, the weighting, or the PCS calculation is performed, a PCS determination means for differentiating the bar-code symbol data thus read to determine a MAX value and for comparing the MAX value with a standard value to determine whether or not the PCS value is proper, and a width data determination means for determining whether or not the width data for each of units of blocks is proper.

The output select section 7E simultaneously outputs a plurality of output data items from respective means of the read section 7C described above, output data from the inclination detect section 7B, and output data from the decode section 7E, or selectively outputs several of them.

The second embodiment of the present invention will next be explained below. To schematically explain the second embodiment, a two-dimensional image pick-up means picks up a bar-code as a two-dimensional image, and on the basis of the image data, a condition of a bar-code is detected as numerical values by the condition detect means. The numerical values include a weighting value or a PCS value, or a bar width and a radiation light conversion rate. The numerical value is compared with a predetermined threshold value. Then, if the numerical value is equal to or lower than the threshold value, it is determined that an error will occur later in reading of a bar-code even if reading of the bar-code is currently possible, and a warning is displayed which indicates that the bar-code has a reading problem.

Figure 2:
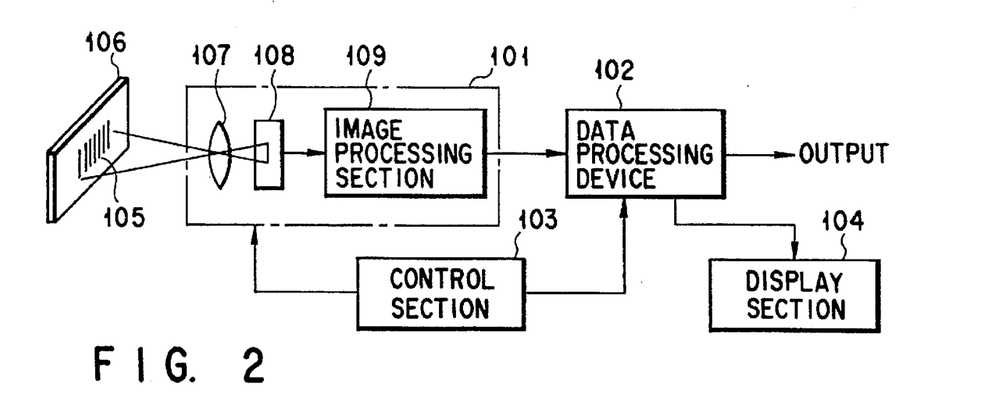
FIG. 2 is a view showing the structure of a symbol data read apparatus according to a second embodiment of the present invention.

FIG. 2 shows a structure of a symbol data read apparatus according to the second embodiment of the present invention. This symbol data read apparatus is roughly divided into components of a two-dimensional image pick-up section 101 for generating a bar-code as a video signal (or data) of a two-dimensional image, a data processing device 102 for processing the data thus read out, a control section 103 for controlling the entire processing, and a display section 104 for performing various displays. In addition, a bar-code (or a bar-code label) read by the symbol read apparatus according to this embodiment is, for example, a stacked bar-code 105 printed on a card 106.

The two-dimensional image pick-up section 101 comprises an image focus lens 107, a two-dimensional image pick-up element 108, and an image processing section 109 for determining a label size of a picked up bar-code and for performing update of matrix or the like. The image processing section 109 may be a CPU. A stacked bar-code 105 whose image is formed on a photoelectric surface of a two-dimensional image pick-up element 108 by the image focus lens 107 is photoelectrically converted to generate a video signal, and the video signal is outputted as bar-code data to the data processing device 102 together with the label size determined on the basis of the video signal.

Figure 3:
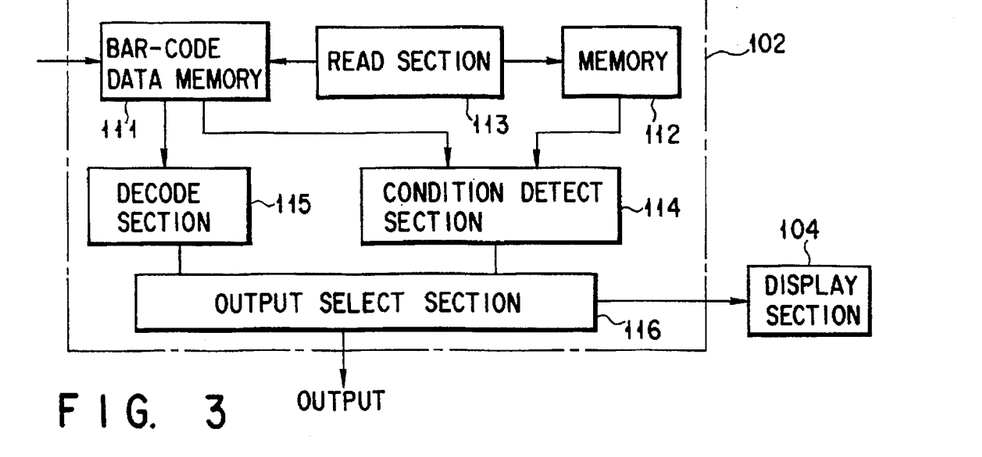
FIG. 3 is a block diagram showing the structure of a data processing apparatus shown in FIG. 2.

As shown in FIG. 3, the data processing device 102 comprises a bar-code data memory 111 for temporarily storing bar-code data to be inputted as a video signal from the two-dimensional image pick-up section 101, a memory 112 including various registers for storing various constants and parameters to determine a condition of a bar-code, a read section 113 for reading necessary bar-code data from the bar-code data memory 111 or the memory 112, a condition detect section 114 for detecting the condition of the bar-code 105 from the bar-code data and the various constants and parameters, a decode section 115 for decoding the bar-code data in the form of a two-dimensional image into original data, and an output select section 116 for selectively outputting data outputted from the respective component sections described above. The condition detect section 114 determines the quality condition of the bar-code, depending on the detected condition of the bar-code. Then, if an error will occur in reading of the bar-code later in a near future although reading is currently possible, a warning indicating is displayed on the display section 104, via the output select section 116.

Figure 4A:
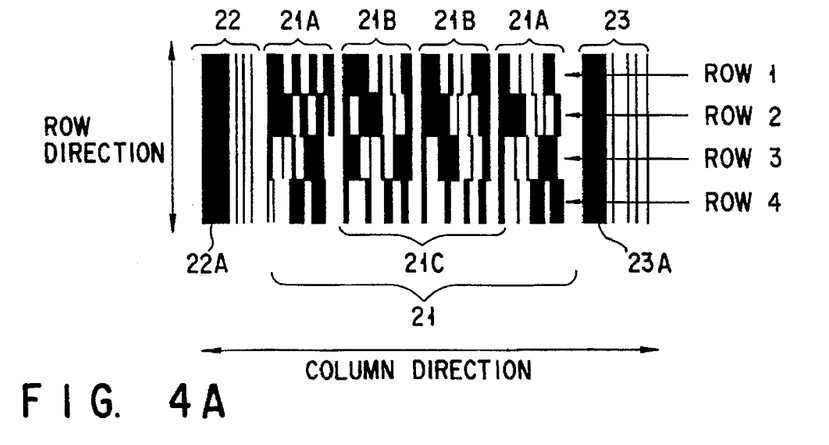
FIG. 4A shows an example of the label structure of a stacked bar-code used in the present embodiments.

FIG. 4A shows a label structure of PDF-417 as an example of a two-dimensional bar-code symbol, e.g., a bar-code label having a 4*2 label matrix.

This bar-code symbol comprises a label portion 21, a start code 22, and a stop code 23. The label portion 21 is an area of data components to be decoded which is constituted by bar-code character groups each consisting of a bar-codes and spaces. The start and stop codes 22 and 23 are respectively arranged in front and rear of the label portion 21.

One bar-code consists of four bars and spaces therebetween, except for the stop code 23. The start and stop codes 22 and 23 respectively start with large bars 22A and 23A each called a "big bar".

The label portion 21 comprises codes called row indicators 21A respectively arranged adjacent to the start codes 22 and 23, and a matrix 21C arranged between the indicators 21A and consisting of a plurality of data columns 21B into each of which data is actually written. A description such as the row direction of a label, the size in the column direction, and the security level, and the like are written in the row indicators 21A. Therefore, information, the size, and the like concerning the label can be determined by decoding the data of the row indicators.

Figure 4B:
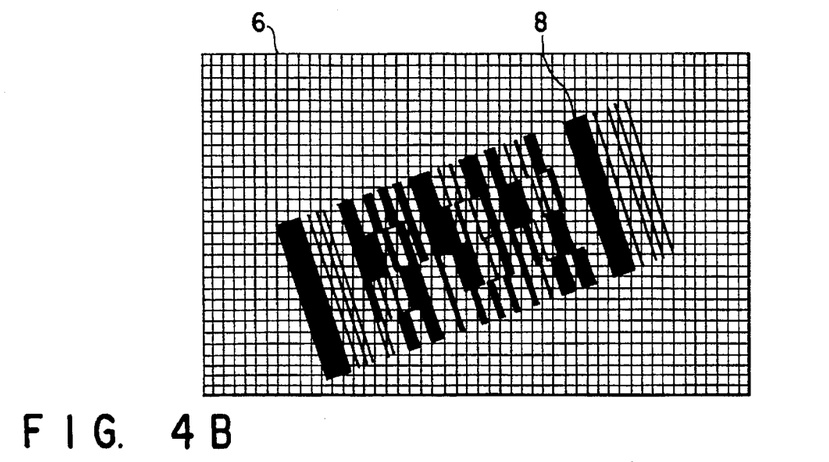
FIG. 4B is a schematic view showing the bar-code label structure of FIG. 4A projected in a pixel arrangement of the frame memory.

In addition, FIG. 4B is a schematic view where a label image of PDF-417 as described above is virtually projected onto the pixel arrangement of the frame memory 6.

Figure 5:
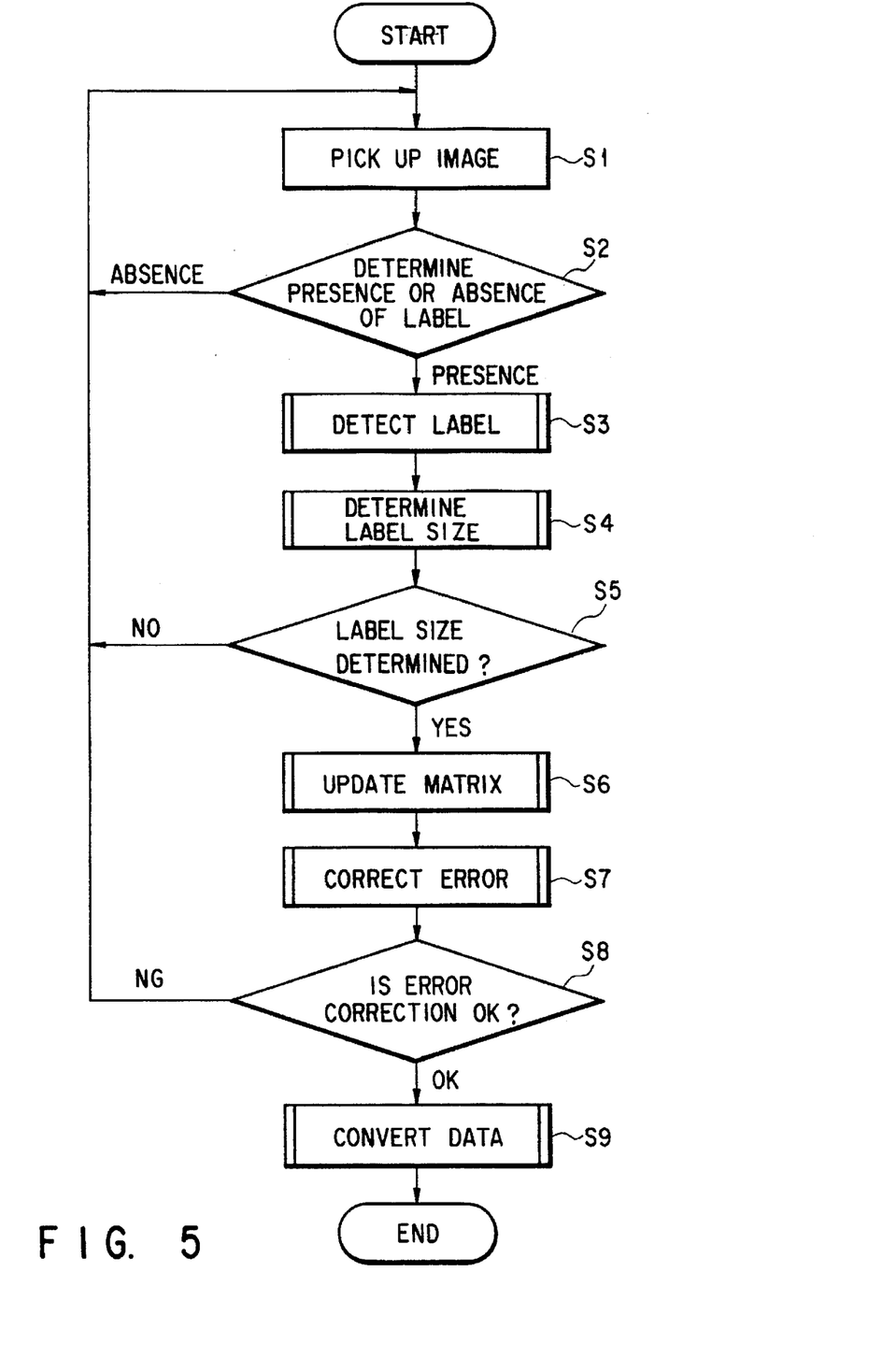
FIG. 5 is a flow-chart for explaining the entire operation of the symbol data read apparatus according to the first and second embodiments.

The data processing device 7 in the first embodiment and the data processing device 102 in the second embodiment read label data on the basis of the algorithm shown in the flow-chart of FIG. 5, and output various data generated therefrom to a host computer not shown. In this state, operation of reading and decoding the label data is described in Japanese Patent Application KOKAI Publication No. 2-268383 and the Japanese Patent Application KOKAI Publication 3-204793, and therefore, a detailed explanation thereof will be omitted herefrom. The operation of the data processing device stated above is substantially common to the first and second embodiments, and therefore, only the operation of the data processing device 7 of the first embodiment will be described in the following.

At first, a bar-code is picked-up by a two-dimensional image pick-up device 5 and taken into a frame memory 6 (step S1). The data processing device 7 reads a bar-code symbol data from the frame memory 6 and determines whether or not a label exists. If a label exists, the data processing device 7 performs label detection as will be described later (steps S2 and S3). In the next, the label size is determined (step S4) as will also be described later, to determine the number of columns and a security level.

In the next, determination is made as to whether or not the label size and the like stated above have been determined (step S5). If not (NO), the processing returns back to the step S1, and the bar-code label is picked up again. If the label size and the like have been determined in the step S5 (YES), matrix updating as will be described later is performed (step S6), and cluster numbers and values are calculated.

The cluster number and the value above will now be briefly explained.

A cluster number is prepared for the purpose of minimizing the provability of an error occurrence in the bar-code shown in FIG. 4A, and is included in each of all code words except for start and stop patterns. The same kind of cluster repeatedly appears for every third row. For example, clusters are repeatedly used in a manner in which a code word of cluster 0 is used for a row 0, a code word of cluster 3 is used for a row 1, and a code word of cluster 6 is used for a row 2.

The value described above is a specific value called a code word value, and one-to-one-corresponds to a code word in a cluster.

Then, after a matrix is determined via a matrix update routine, determination of an erasure error and correction of an error are performed (step S7). The erasure error means a state where a code word is defective or cannot be read out. In this case, the position of a code word can be recognized but the code word value thereof cannot be recognized.

Next, determination is made as to whether or not a bar-code has been properly corrected (step S8). If error correction has been properly completed (YES), processing goes to data conversion (step S9), and then returns. If error correction is impossible (NO), the processing goes back to the step S1 described above, and the bar-code is picked up again.

In this step S9, data read and corrected in the steps S6 and S7 is decoded into user data, and is outputted to a host computer not shown.

The following explanation will be made details of respective sub-routines included in the flow-chart of FIG. 5.

Figure 6:
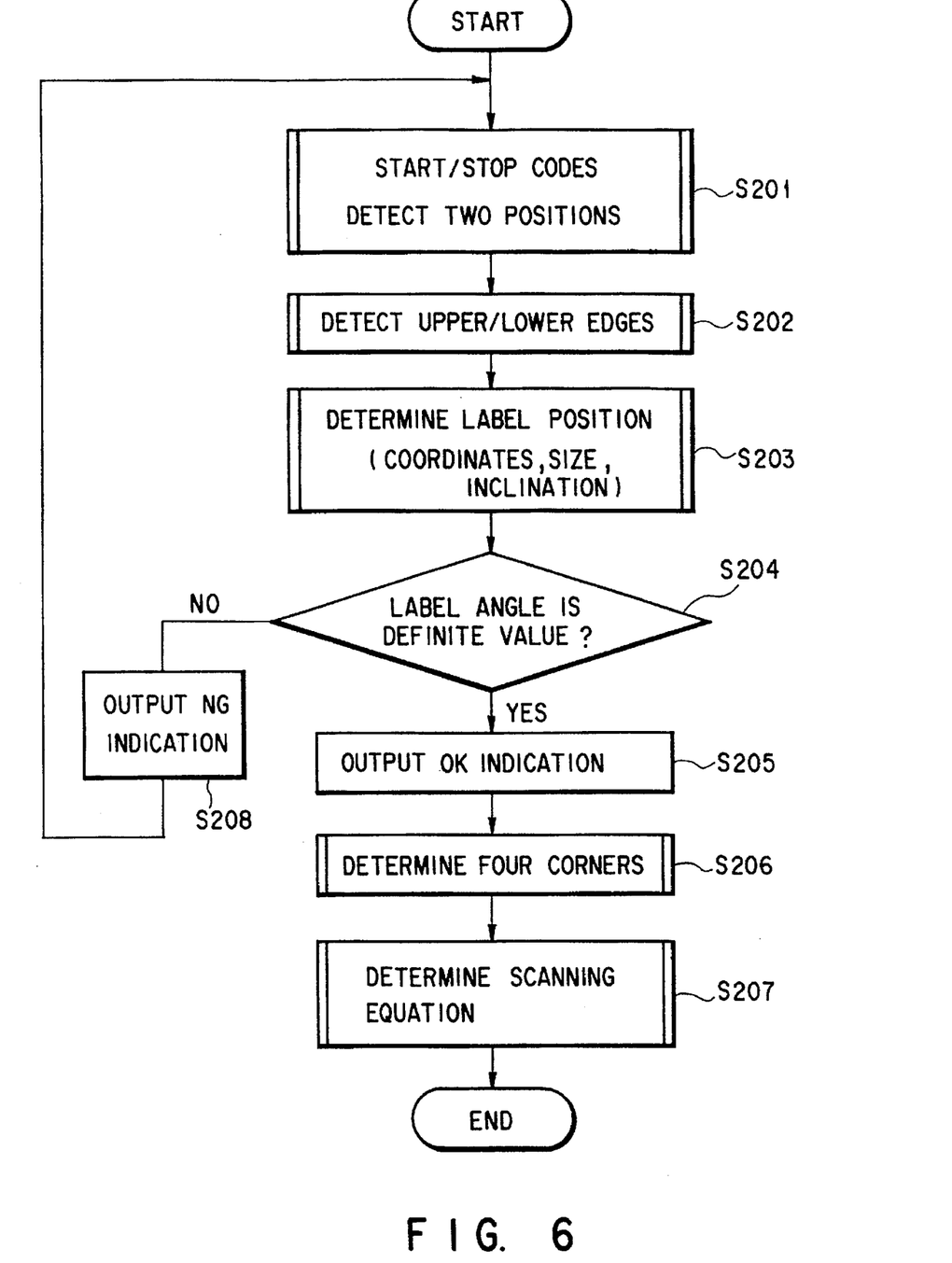
FIG. 6 is a flow-chart for explaining a label detect routine of FIG. 3.

FIG. 6 shows processing steps of a label detect routine. In this label detect routine, detection is made as to whether or not start and stop codes are included in the data taken into the frame memory 6 (step S201). As a detection method thereof, the data in the frame memory 6 is scanned for every n-th row starting from the top of the data, to detect start and stop codes prepared for synchronization of the PDF-417 symbol.

The start pattern is defined by an X-sequence of 81111113, while the stop pattern is defined by another X-sequence of 711311121. Therefore, a confirmation of existence of these sequences means detection of the start and stop codes. Next, upper and lower edges are detected to determine the upper and lower ends of a label (step S202). As a detection method thereof, a line extending in the longitudinal direction is taken and scanned from its center to its outsides, thereby enabling edge extraction.

In the next, a routine for determining the label position is carried out (step S203), coordinates of four corners of the label, the size of the label, and the inclination thereof are determined on the basis of positions of the start and stop codes obtained by the start/stop detect routing (step S201) and positions of the upper and lower edges obtained by the upper/lower edge detect routine (step S202). Subsequently, whether or not the label angle is a definite value (0°±0.5°) is determined (step S204). If the label angle is a definite value, an OK indication is outputted to a display section not shown (corresponding to the display section 104 of the second embodiment) (step S205), and thereafter, coordinates of four corners are obtained by a routine for determining four corners (step S206). From the coordinates of the four corners, a scanning equation representing the direction in which the label is scanned in the later processing is determined by the equation formula determination routine (step S207).

If it is determined that the label angle is not a definite value, an NG indication is outputted to the display section not shown (corresponding to the display section 104 of the second embodiment) (step S208), and thereafter, an image is picked up again in the step S1 shown in FIG. 5. Then, the processing goes to the step S201, and is repeated until a label angle equivalent to the definite value is obtained. To actually adjust the label angle, the following operation will be performed.

1. An operator (or tester) moves a label until an "OK" is displayed.

2. An operator rotates a stage or a label until an "OK" is displayed.

Figure 7:
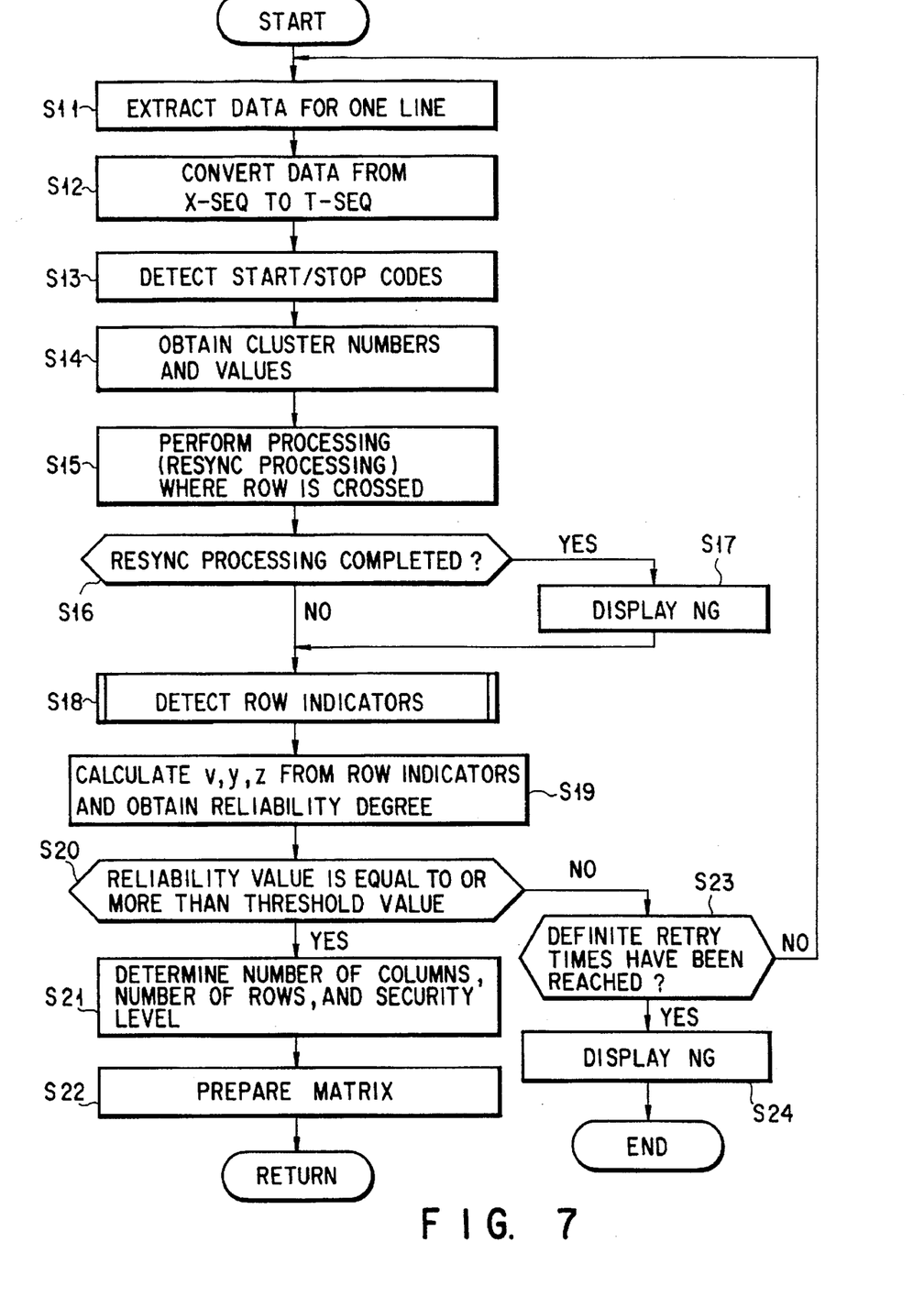
FIG. 7 is a flow chart for explaining a label size determine routine of FIG. 3.

In the next, details of the label size determination routine will be explained with reference to the flow-chart shown in FIG. 7. To determine the label size, the number of columns, the number of rows, and the security level are determined.

At first, data for one line of a target image picked up is extracted in accordance with an scanning equation obtained by the label detect routine (step S11).

Next, the data for one line is converted from an X-sequence (abbreviated as only an X-seq hereinafter) to a T-sequence (abbreviated as only a T-seq hereinafter) (step S12). Supposing that data is formed of repetitions of paired black and white patterns, each X-seq represents a width of one pattern and a T-seq represents a sum of white and black patterns.

Subsequently, start and stop codes are detected (step S13). A bar-code includes specific start and stop codes as shown in FIG. 4A, and the start and stop codes are detected by performing comparison of the start and stop patterns converted into T-seqs.

Next, cluster numbers and values are obtained (step S14). Actually, values are obtained by an equation, and then, a previously prepared table is referred to on the basis of the values thus obtained.

Subsequently, resync processing when a reading light beam crosses a row is performed (step S15). For example, in a case where scanning is performed, bridged between rows, eight X-seq data items do not always describe one code word. Therefore, it is necessary to perform processing for repeating dummy reading until the length of the data obtained reaches an integral product of a codeword. In this processing, the cluster numbers and values obtained by the step S14 are used to perform the processing.

Next, determination is made as to whether or not the resync processing has been performed (step S16). If the processing has not been carried out (NO), a next row indicator is detected (step S18). However, if the resync processing has been performed (YES), an NG indication (step S17) is displayed on a display section not shown (corresponding to the display section 104 of the second embodiment), and the processing goes to the step S18 stated above. To perform resync processing means that scanning is performed, bridged between rows, and it therefore means a possibility of a decrease in reliability of reading. In order to prevent the decrease in reading reliability, presence or absence of a resync processing is detected to serve to output a warning.

Then, after a next row indicator is detected in the step S18, v, y, and z are calculated and a reliability degree concerning the v, y, and z thus calculated is obtained (step S19).

These v, y, and z are included in a row indicator in accordance with a certain rule, and can therefore be calculated on the basis of data from the detected row indicator. In addition, v is a value using the number of columns as its parameter, y is a value using the number of rows as its parameter, and z is a value using an error correction level and the number of rows as its parameters.

Whether or not the reliability degree is equal to or higher than a predetermined value is determined (step S20). This reliability degree is determined by reading calculated values of v, y, and z for several times, and by determining whether or not equal results are obtained. When the results are equal to each other within a certain range, it is determined that the reliability degree is high. The predetermined value stated above is a experimentally set value.

If it is determined that the reliability degree is low (NO), the processing is repeatedly returned back to the step S11 for a defined number of times (or a number of retry times) and the processing is repeated such that the reliability degree reaches a definite value (step S23). If the reliability degree does not reach the definite value after the processing is repeated for a defined number of times (YES), an NG indication is displayed on the display section not shown (corresponding to the display section 104) and the processing is ended (step S24).

However, if it is determined that the reliability degree is higher than the definite value in the step S20 stated above (YES), the number of columns, the number or rows, and the security level are calculated (step S21).

In the next, a necessary matrix is prepared on the basis of the number of columns, the number of rows, and the security level (step S22), and the processing is returned to the routine of FIG. 5.

Figure 8:
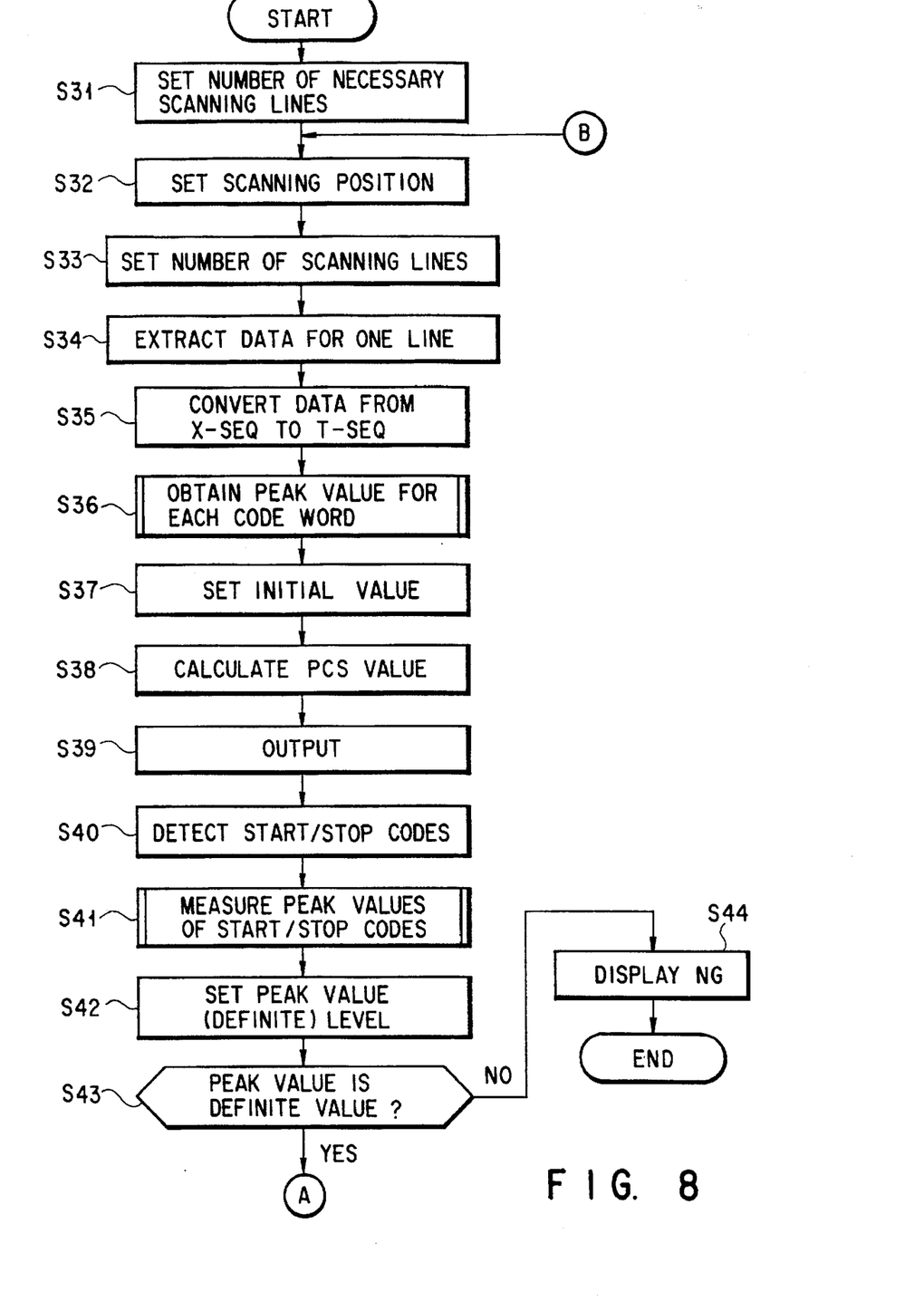
FIG. 8 is a front part of a flow-chart for explaining a matrix update routine of FIG. 3.
Figure 9:
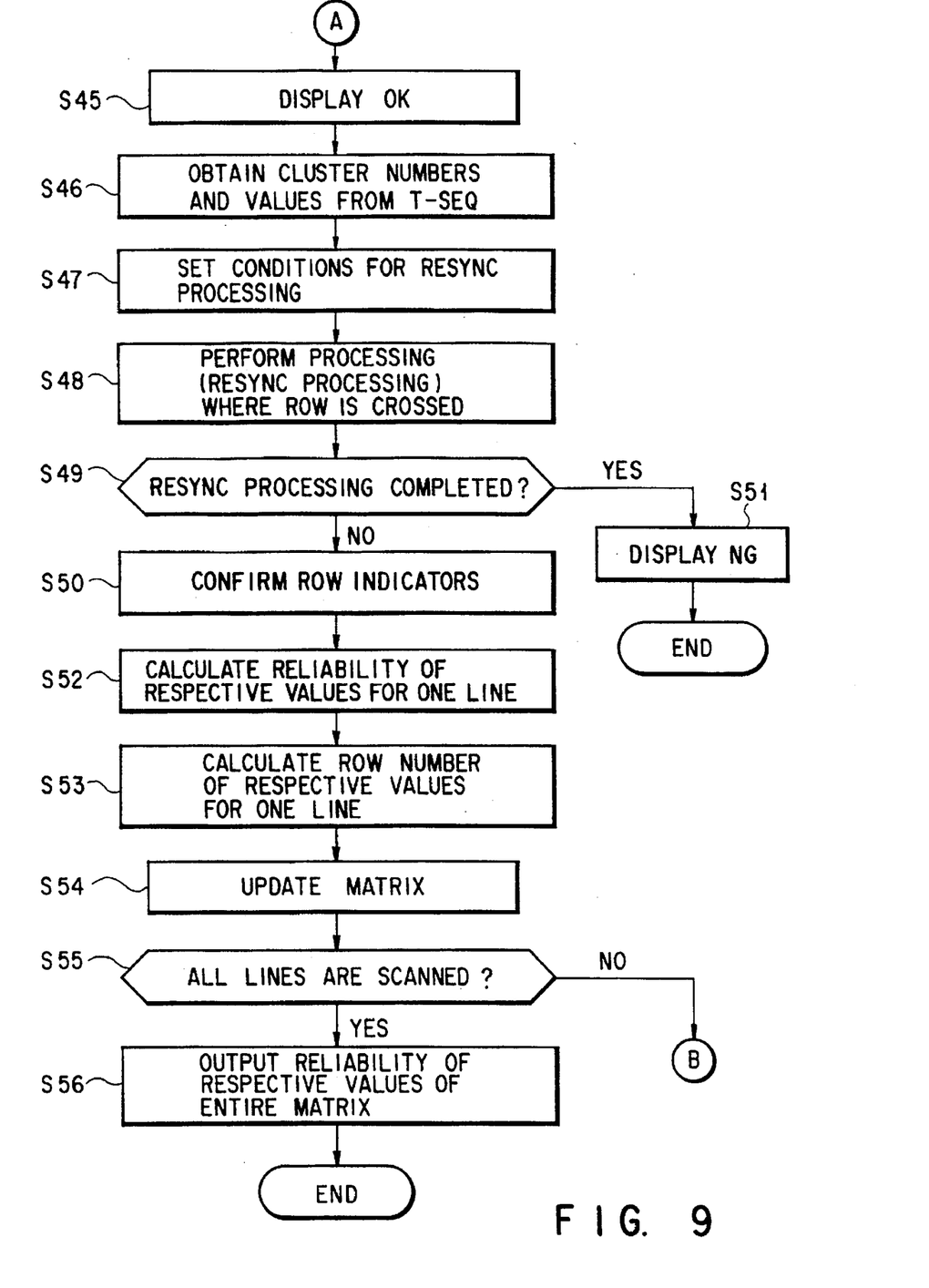
FIG. 9 is a rear part of a flow-chart for explaining a label detect routine of FIG. 3.

The following explanation will be made to a routing for updating a matrix, with reference to the flow-charts shown in FIGS. 8 and 9. This sub-routine mainly performs calculation of cluster numbers and values, and updating of data in the matrix.

At first, a necessary scanning number is set on the basis of the label size determined in the step S4 shown in FIG. 5 (step S31). Setting of scanning positions of respective rows are performed (step S32) with use of the scanning number, to set the number of scanning lines for every row (step S33). Resetting is performed to scan the center of each row for second and later scanning in the step S32. Here, the scanning means scanning in the lateral direction (or the column direction) of the label.

In the next, the data for one line of a target image is extracted (step S34), and is converted from an X-seq into a T-sequence (step S35). Supposing that data is formed of repetitions of black and white patterns, each X-seq represents a width of one pattern and a T-seq represents a sum of widths of white and black patterns.

Figure 12:
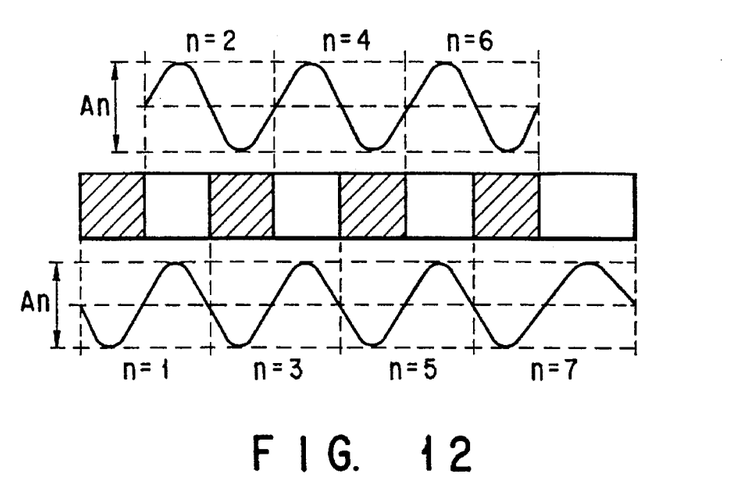
FIG. 12 is a view for explaining a peak value determine routine (i.e., a step S36) of each code word of FIG. 8.
Figure 13:
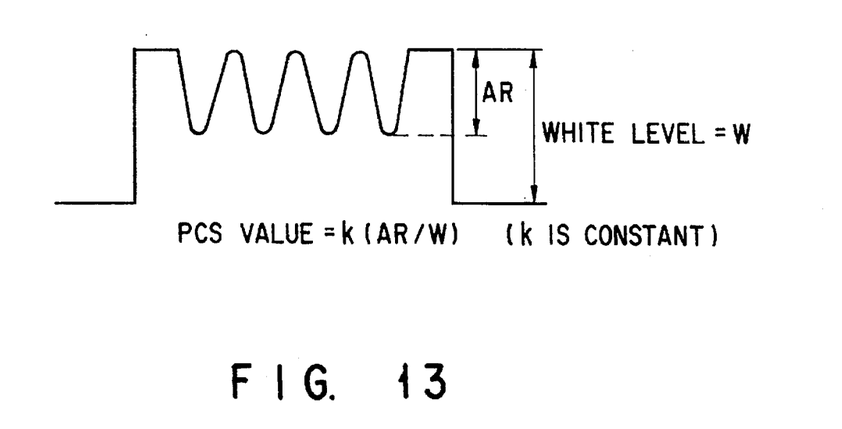
FIG. 13 is a view for explaining a PCS value calculate step (i.e., a step S38) of FIG. 8.

Subsequently, a peak value is obtained for each code word (step S36). To calculate peak values, a peak value in each code word is obtained from its T-seq. Specifically, white and black patterns are considered as one pair, and seven differences (An, n=1 to 7) in level between white and black patterns are obtained and are averaged, as shown in FIG. 12. Next, an absolute white level is set by initial value setting (step S37), and thereafter, a PCS value (or a bar width and a radiation light conversion rate) is calculated (step S38). More specifically, a ratio of a white level to a amplitude value between white and black levels is obtained and is used to determine a PCS value. Then, the PCS value is outputted for every code word, as shown in FIG. 13 (step S39).

Next, start and stop codes are detected (step S40). The example of a bar-code shown in FIG. 4A includes specific start and stop codes. Therefore, the start and stop codes are detected by performing comparison of the start and stop patterns converted into T-seqs.

Subsequently, peak values of start and stop code positions are measured (step S41). In the measurement of these peak values, supposing that the starting y-coordinate and the ending y-coordinate of the start code 22 or the stop code 23 are respectively set to points p and q, data from the point p to point q is differentiated. Then, the absolute value of the third peak value of the differentiated data is determined as a parameter MAX which is used as the peak value. The third peak value differentiated is used as the peak value, because the third edge which has the smallest distance between a bar and a space of a label is selected on the ground that the portion where the contrast is experimentally considered as the lowest in a bar-code area needs to be set as a threshold value, i.e., because the portion where the differentiation peak is the lowest needs to be set as a threshold value. This selection enables stable decoding without being influenced by the label size or the illumination condition of a label.

On the basis of the peak value stated above, a peak value level (or a threshold value) is set (step S42). Level determination of a peak value obtained from a bar-code picked up is made by the threshold value thus set (step S43).

If the peak value level is equal to or higher than the threshold value (YES), an OK indication is displayed on a display section not shown (corresponding to the display section 104 of the second embodiment) (step S45), and the processing goes to a next step S46. However, if the peak value level does not reach the threshold value (NO), an NG indication is displayed in the display section not shown (corresponding to the display section 104) (step S44), and the series of processing is ended.

Next, in the step S46, cluster numbers and values are obtained. Actually, these values are obtained by equations, and a table is referred to with respect to the obtained values.

In the next, conditions relating to resync processing are set (step S47). In actual decoding, scanning may be performed, bridged between rows, and therefore, the conditions which allow the processing to go to resync processing should preferably be set to be loose.

However, there may be a case where determination concluding no problems is made even when a label includes a void, like when a bar-code is scanned obliquely. Therefore, when confirmation of a label or the like is performed, conditions relating to resync should preferably be set to be stricter than normal reading. After the conditions relating to resync processing are set, resync processing to be performed when crossing a row is performed (step S48). For example, when scanning is performed, bridged between rows, eight X-seq data items do not always describe one code word. Therefore, it is necessary to perform processing for repeating dummy reading until the length of the data obtained reaches an integral product of a codeword. In this processing, the cluster numbers and values obtained by the step S46 are used to perform the processing.

Then, determination is made as to whether or not the resync processing has been performed (step S49). If the resync processing has been performed (YES), scanning has been performed, bridged between rows, and therefore, there is a possibility of a decrease in the reliability degree. In order to prevent the decrease in the reliability degree, presence or absence of a resync processing execution is detected to generate a warning.

If the resync processing has been performed (YES) in the step S49, an NG indication is displayed in the step 51 on a display section not shown (corresponding to the display section 104 of the second embodiment), and the series of processing is ended. If the resync processing has not been carried out (NO), confirmation of a next row indicator is performed (steps S50). In the confirmation of the row indicator, data concerning v, y, and z are obtained from the row indicator, and from the results of the data, the row number is calculated. Then, confirmation is made as to whether or not the row number and the position of the row whose current or later reliability degree is to be calculated are correct.

Next, the reliability degree of values for one line is calculated (steps S52). Actually, a table is referred to with use of cluster numbers of three portions including the self-portion and two positions adjacent thereto. Then, the row numbers of respective values for one line described above (steps S53). Calculation of the row numbers is performed for the purpose of properly inputting the respective values calculated for one line into the corresponding target line. Next, the matrix is updated (step S54). Specifically, the values for one line are used to fill the matrix. Until processing of the number of scanning lines set in the step S31 is completed, the processing repeatedly returns to the step S32 and the same processing is repeatedly performed (step S55).

Then, after processing of the set number of scanning lines is completed, reliability degrees of respective values are outputted (step S56), and the processing returns. The data in the matrix at this time-point includes an erasure error which will be described later. Due to output data relating to the reliability degree, the quality of a label can be determined.

Figure 10:
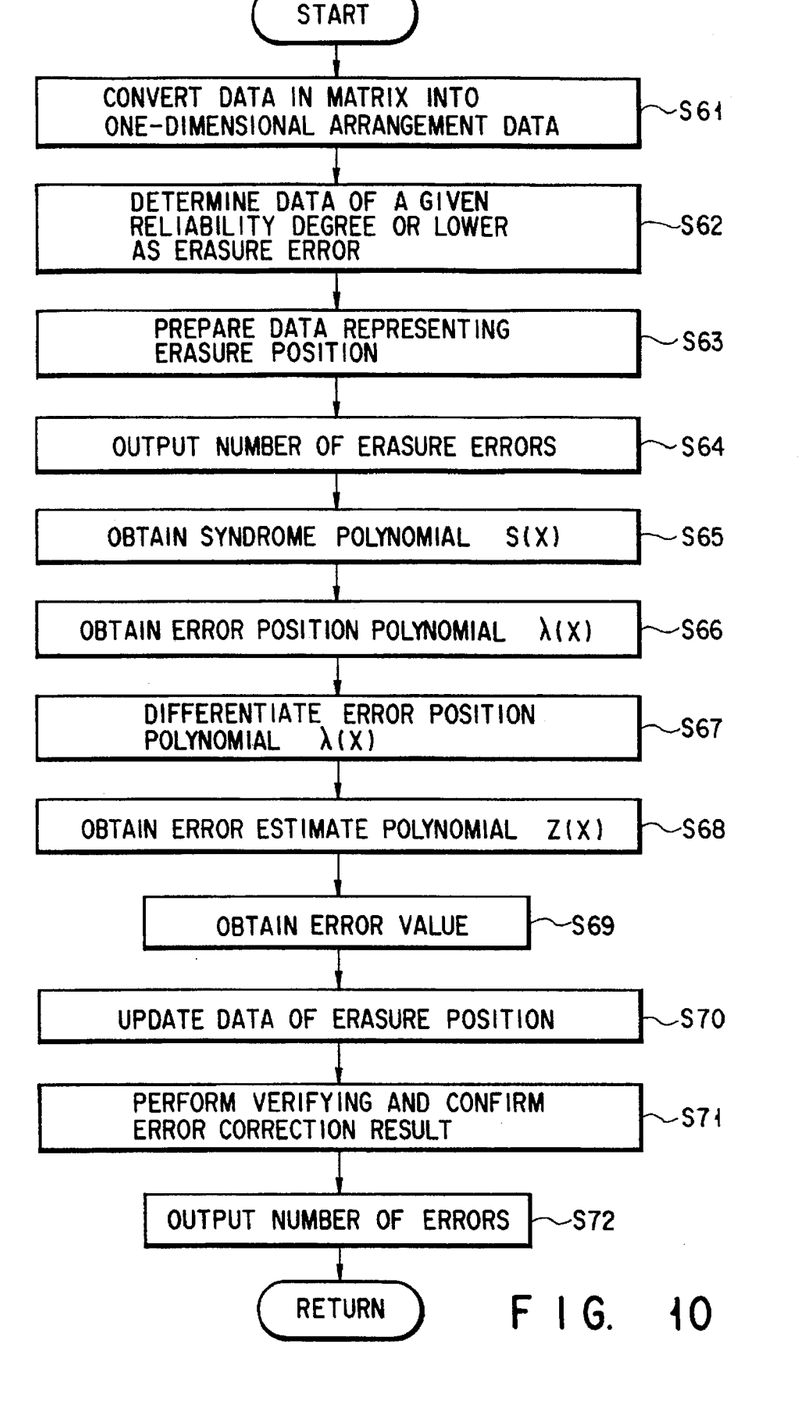
FIG. 10 is a flow-chart for explaining an error correct routine of FIG. 3.
Figure 11:
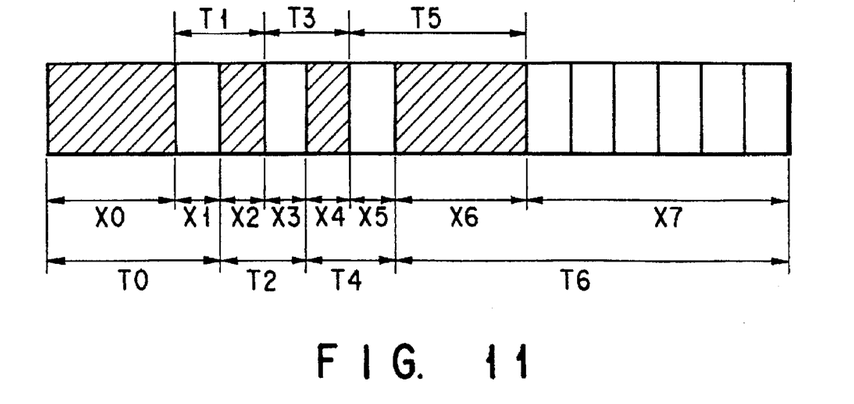
FIG. 11 is a view for explaining an X-sequence and a T-sequence.

In the next, error correction in the step S7 of FIG. 5 will be explained with reference to the flowchart shown in FIG. 10. At first, the matrix determined by the matrix updating in the step S6 of FIG. 5 is used to convert the data in the matrix into one-dimensional arrangement data (step S61). Then, the one-dimensional arrangement data having a given reliability degree or a lower reliability degree is defined as an erasure error (step S62). Data indicating an erasure (code word) position of one-dimensional arrangement data determined as an erasure error is prepared (step S63), and the number of erasure errors is outputted to a host computer or the like not shown.

In an error correction label, there are two types of errors, i.e., an erasure error and a general error. An erasure error means a state in which a code word is defective or cannot be read out. In this case, the code word position is recognized but the code word value is not recognized. On the other hand, a general error means a code encoded by a mistake. In this case, neither the position nor the value can be recognized. Hence, it is possible to output an erasure error and a general error distinguished from each other.

The error correction processing stated above is specifically described in "Code Theory" (by Hideki Imai, Corona-Sha), and ShuLin and D. J. Costello Jr: Error Control Coding, Fundamentals and Applications, Prentice-Hall (1983), and detailed explanation of this processing will be omitted herefrom.

Next, error correction processing is performed within a range which allows decoding, with respect to the erasure error stated above. At first, a syndrome polynomial S(x) is obtained (step S65). Then, an error position polynomial λ(x) is obtained (step S66), and is differentiated (step S67). Further, an error estimation equation Z(x) is obtained (step S68). An error value is determined by these polynomials and equation (step S69).

On the basis of this error value, data of the position determined as an erasure error is updated (step S70), and the data subjected to error correction is inputted into the erasure error position. Thereafter, verifying is performed, and error correction results are confirmed (step S71). Then, the number of errors which could not be corrected is counted and outputted to an external host device or the like (step S72).

If error correction has been completed, it is possible to display presence or absence of an error, and the position of an error if any, by comparing the corrected data with data including an erasure error before correction.

Each of output data determined by data read processing as has been explained above, an inclination determination OK indication, an inclination determination NG indication, a resync NG indication (step S17), an NG indication concerning a reliability degree (step S24), a peak indication for each code word (S36), a peak value determination NG indication (S44), a peak value determination OK indication (S45), a resync NG indication (S51), a reliability degree output concerning respective values of the entire matrix (S56), an erasure error number output (S64), and an error number output (S72) can be selectively or simultaneously be outputted to a display section, an external host computer, or the like.

In addition, confirmation of a stacked bar-code which satisfies the object of the present invention can be achieved by adapting reading steps which are performed in other symbol data read apparatuses than the embodiments of the present invention, to a symbol data read apparatus described in Japanese Patent Application KOKAI Publication No. 5-324887, As has been explained above with reference to the embodiments of the present invention, by providing a symbol data read apparatus with a function of outputting results of various read processing, confirmation and reading can be securely performed in a short time period, with use of one single apparatus.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A symbol data read apparatus comprising:
   image pick-up means for picking up a bar-code symbol as a two-dimensional image, said bar-code symbol including at least one bar and at least one space;
   memory means for storing the two-dimensional image picked up by the image pick-up means as bar-code symbol data;
   condition detect means for detecting a bar-code condition of the bar-code symbol from the bar-code symbol data stored in the memory means;
   decode means for performing decode-processing to obtain original bar-code symbol data on the basis of bar-code condition data detected by the condition detect means and the bar-code symbol data stored in the memory means; and
   output select means for selectively outputting at least bar-code condition data.

2. A symbol data read apparatus according to claim 1, wherein the bar-code condition data includes a plurality of bar-code condition data items detected by the condition detect means.

3. A symbol data read apparatus according to claim 2, wherein the bar-code condition data comprises inclination data concerning the bar-code symbol.

4. A symbol data read apparatus according to claim 2, wherein the bar-code condition data comprises a weighting value for each of blocks constituting the bar-code symbol.

5. A symbol data read apparatus according to claim 2, wherein the bar-code condition data comprises a PCS value outputted in units of code words.

6. A symbol data read apparatus according to claim 2, wherein the bar-code condition data comprises a PCS value determination signal.

7. A symbol data read apparatus according to claim 2, wherein the bar-code condition data comprises a number of errors of the bar-code symbol.

8. A symbol data read apparatus according to claim 4, wherein the bar-code condition data comprises an error count number determined based on the weighting value for each of blocks constituting the bar-code symbol.

9. A symbol data read apparatus according to claim 4, wherein the bar-code condition data comprises an error count number of errors for which error correction is failed, the errors being determined based on the weighting value for each of blocks constituting the bar-code symbol.

10. A symbol data read apparatus according to claim 2, further comprising means for appropriately selecting and outputting at least one of the plurality of bar-code condition data items.

11. A symbol data read apparatus according to claim 1, wherein the condition detect means includes means for determining whether or not the bar-code symbol has a proper width.

12. A symbol data read apparatus according to claim 1, further comprising read means for reading the bar-code symbol data stored in the memory means, wherein a reading condition when reading is performed by the read means is changed.

13. A symbol data read apparatus according to claim 12, wherein switching of the reading condition includes switching of an allowable width set value in units of blocks constituting the bar-code symbol.

14. A symbol data read apparatus according to claim 12, wherein switching of the reading condition includes switching of a number of scanning lines when the bar-code symbol is read out sequentially.

15. A symbol data apparatus comprising:
   image pick-up means for picking up a bar-code as a two-dimensional image, said bar-code representing data including at least one bar and at least one space;
   condition detect means for detecting a pick-up condition of the bar-code, as a numerical value, from the two-dimensional image obtained by the two-dimensional pick-up means, and for comparing the numerical value with a predetermined threshold value, thereby to detect a condition of the bar-code;
   display means for displaying the condition of the bar-code detected by the condition detect means; and decode means for performing decode-processing to obtain original symbol data on the basis of the two-dimensional image picked up by the two-dimensional image pick-up means.

16. A symbol data apparatus according to claim 15, wherein said condition detect means includes:

means for detecting, as the numerical value representing the condition of the bar-code, at least one of the following:
- a) a bar width and a radiation light conversion rate,
- b) a PCS value outputted in units of code words,
- c) a weighting value for each of blocks constituting the bar-code,
- d) a PCS value determination signal,
- e) a number of errors of the bar-code,
- f) an error count number determined based on the weighting value for each of blocks of the bar-code, and
- g) an error count number of errors for which error correction is failed, the errors being determined based on the weighting value for each of blocks constituting the bar-code symbol; and memory means for storing a threshold value corresponding to each of the above numerical values.

17. A symbol data apparatus according to claim 15, wherein the condition detect means includes means for determining a level of quality of the bar-code, based on the detected pick-up condition of the bar-code, and means for outputting a warning to the display means indicating a possibility that a reading error may occur, if the level of quality of the bar-code is determined to be equivalent to or lower than an experimentally determined level of quality at which an error may occur during future readings of the bar-code although the bar-code is still currently readable.

* * * * *